United States Patent
Tong et al.

(10) Patent No.: US 8,699,238 B1
(45) Date of Patent: Apr. 15, 2014

(54) METHOD AND APPARATUS FOR STABILIZING POWER CONVERTERS

(75) Inventors: Arthur Tong, Gloversville, NY (US); Paul Clouser, Williston, VT (US)

(73) Assignee: Sedona International, Inc., Nashua, NH (US)

( * ) Notice: Subject to any disclaimer, the term of this patent is extended or adjusted under 35 U.S.C. 154(b) by 215 days.

(21) Appl. No.: 13/280,097

(22) Filed: Oct. 24, 2011

Related U.S. Application Data

(63) Continuation-in-part of application No. 13/074,679, filed on Mar. 29, 2011.

(60) Provisional application No. 61/405,863, filed on Oct. 22, 2010, provisional application No. 61/405,874, filed on Oct. 22, 2010, provisional application No. 61/318,460, filed on Mar. 29, 2010.

(51) Int. Cl.
   *H02M 3/335* (2006.01)

(52) U.S. Cl.
   USPC ............ 363/21.02; 363/16; 363/90; 323/232; 323/233; 323/355

(58) Field of Classification Search
   USPC ............. 363/16, 21.02, 21.03, 40, 55, 90, 95, 363/97, 131; 307/104; 323/224, 232, 233, 323/266, 355, 356
   See application file for complete search history.

(56) References Cited

U.S. PATENT DOCUMENTS

| | | | |
|---|---|---|---|
| 4,257,087 A * | 3/1981 | Cuk | 363/16 |
| 5,701,238 A * | 12/1997 | Weidinger et al. | 363/21.07 |
| 5,768,111 A * | 6/1998 | Zaitsu | 363/15 |
| 6,304,460 B1 | 10/2001 | Cuk | |
| 6,388,896 B1 | 5/2002 | Cuk | |
| 6,400,579 B2 | 6/2002 | Cuk | |
| 6,462,962 B1 | 10/2002 | Cuk | |
| 6,469,913 B2 * | 10/2002 | Hosotani et al. | 363/16 |

* cited by examiner

*Primary Examiner* — Nguyen Tran
*Assistant Examiner* — Afework Demisse
(74) *Attorney, Agent, or Firm* — Burns & Levinson LLP; Bruce D. Jobse, Esq.

(57) ABSTRACT

A modified power converter circuit utilizes an RLC circuit tuned to the frequency of any instability in the power converter circuit in order to remove the instability in the circuit output. In one embodiment, a pair of RLC circuits are connected in parallel across the input capacitor and output capacitor of the power circuit topology, respectively. The capacitor and inductor of each RLC circuit act as filters having a period with the same value as the instability created by interaction of the respective input or output capacitor with the isolation transformer inductance and expose the resistor within each the RLC circuit to only the frequency of instability.

20 Claims, 2 Drawing Sheets

POWER CONVERTER WITH STABILIZATION CIRCUIT

METHOD AND APPARATUS FOR STABILIZING POWER CONVERTERS

RELATED APPLICATION

This application claims priority to U.S. patent application Ser. No. 13/074,679, filed Mar. 29, 2011, entitled METHOD FOR REDUCING PARASITIC EFFECTS WITH IN-LINE CIRCUIT COMPONENTS, the subject matter of which is incorporated herein by this reference for all purposes. This application further claims priority to U.S. Provisional Application No. 61/405,863, filed Oct. 22, 2010, entitled METHOD AND APPARATUS FOR STABILIZING POWER CONVERTERS, and U.S. Provisional Application No. 61/405,874, filed Oct. 22, 2010, entitled METHOD AND APPARATUS FOR COAXIAL INTERCONNECTION AND ISOLATION OF TOROIDAL CIRCUIT ELEMENTS, the subject matter of which is also incorporated herein by these references for all purposes.

In addition, this application is filed on even date herewith with commonly owned patent application entitled METHOD AND APPARATUS FOR COAXIAL INTERCONNECTION AND ISOLATION OF TOROIDAL CIRCUIT ELEMENTS by the same inventor, Ser. No. 13/280,153, the subject matter of which is also incorporated herein by this reference for all purposes.

FIELD OF THE INVENTION

The disclosure relates to power conversion circuits, and, more specifically, to a technique for stabilizing power converter circuits.

BACKGROUND

Numerous power converter circuits are known, such as those disclosed in U.S. Pat. Nos. 6,304,460, 6,388,896, 6,400,579, and 6,462,962. Many of these circuits, however, create unstable resonances which prevent the circuit from being used as a stable power supply. Accordingly, need exists for a stable power converter circuit design that eliminates the instability of existing known power converters.

SUMMARY

Disclosed is a modified power converter circuit utilizes an RLC circuit tuned to the frequency of any instability in the power converter circuit in order to remove the instability in the circuit output. In one embodiment, a pair of RLC circuits are connected in parallel across the input capacitor and output capacitor of the power circuit topology, respectively. The capacitor and inductor of each RLC circuit act as filters having a period with the same value as the instability created by interaction of the respective input or output capacitor with the isolation transformer inductance and expose the resistor within each the RLC circuit to only the frequency of instability.

According to one aspect of the disclosure, a kit apparatus is used to stabilize a periodic instability in the output of a power converter, the power converter having an isolation transformer operatively coupled to a power converter input by an input capacitor and an input inductor and further operatively coupled to a power converter output by an output capacitor and an output inductor. The kit comprises: a primary stabilizing subsystem comprising a primary stabilizing capacitor, a primary stabilizing inductor, and primary resistor; and a secondary stabilizing subsystem comprising a secondary stabilizing capacitor, a secondary stabilizing inductor, and a secondary stabilizing resistor. The primary stabilizing subsystem is configured for connection in parallel with the input capacitor between the isolation transformer and the input inductor. The secondary stabilizing subsystem is configured for connection in parallel with the output capacitor between the isolation transformer and the output inductor.

According to a second aspect of the disclosure, a method for eliminating instability in the output of existing power converters, the power converter having an isolation transformer operatively coupled to a power converter input by an input capacitor and an input inductor and further operatively coupled to a power converter output by an output capacitor and an output inductor. The method comprising: A) providing a primary stabilizing subsystem further comprising: i) a primary stabilizing capacitor, ii) a primary stabilizing inductor, and iii) a primary resistor; and B) providing a secondary stabilizing subsystem further comprising: i) a secondary stabilizing capacitor, ii) a secondary stabilizing inductor, and iii) a secondary resistor. The method further comprises C) connecting the primary stabilizing subsystem in parallel with the input capacitor between the isolation transformer and the input inductor; and D) connecting the secondary stabilizing subsystem in parallel with the output capacitor between the isolation transformer and the output inductor.

According to a third aspect of the disclosure, a power converter circuit system comprises: an isolation transformer operatively coupled to a power converter input and a power converter output; a serially connected input capacitor and input inductor pair coupled intermediate a node of the power converter input and a node of the isolation transformer; a serially connected output capacitor and output inductor pair coupled intermediate a node of the power converter output and a node of the isolation transformer; a primary stabilizing RLC branch coupled in parallel with the input capacitor, the primary stabilizing RLC branch comprising a primary stabilizing resistor serially coupled intermediate a primary stabilizing capacitor and a primary stabilizing inductor; and a secondary stabilizing RLC branch coupled in parallel with the output capacitor, the secondary stabilizing RLC branch comprising a secondary stabilizing resistor serially coupled intermediate a secondary stabilizing capacitor and a secondary stabilizing inductor.

DESCRIPTION THE DRAWINGS

DETAILED DESCRIPTION

TABLE 1-1

| Reference Number | | Circuit Component |
|---|---|---|
| 1 | - | Input Inductor L1 |
| 2 | - | Input Capacitor C1 |
| 3 | - | Output Capacitor C2 |
| 4 | - | Output Inductor L2 |
| 5 | - | Load Resistor R1 |

TABLE 1-1-continued

| Reference Number | | Circuit Component |
|---|---|---|
| 6 | - | Input Switch S1 |
| 7 | - | Isolation Transformer T1 |
| 8 | - | Output Switch S2 |
| 9 | - | Primary Stabilizing Capacitor Cd1 |
| 10 | - | Primary Stabilizing Resistor Rd1 |
| 11 | - | Primary Stabilizing Inductor Ld1 |
| 12 | - | Secondary Stabilizing Inductor Ld2 |
| 13 | - | Secondary Stabilizing Resistor Rd2 |
| 14 | - | Secondary Stabilizing Capacitor Cd2 |
| 15 | - | Input Voltage Source V in |

Figure 3:
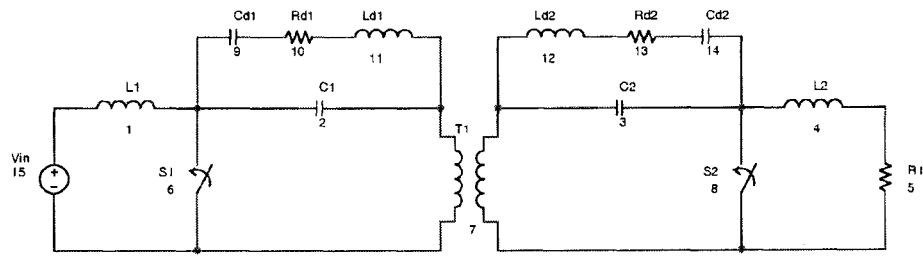
FIG. 3 is a schematic diagram of the power converter disclosed herein.

FIG. 3 is a schematic diagram of the power converter circuit 25 in and with which the disclosed stabilization technique and circuit may be implemented. Power converter circuit 25 is configured to produce an output voltage Vout across Load Resistor R1, given a constant input voltage Vin from Input Voltage Source. In the contemplated embodiment, Load Resistor R1 and Input Voltage Source are connectable to, but not part of, circuit 25 and are illustrated for exemplary purposes only. As used herein, the input of the power converter circuit 25 is defined intermediate the nodes to which the voltage input source 15 is connected, that is between switch S1 and input inductor L1, as illustrated in FIG. 3. Similarly, the output of the power converter circuit 25 is defined intermediate the nodes to which load resistor R1 is connected, that is between switch S2 and output inductor L1, as illustrated in FIG. 3.

Figure 1:
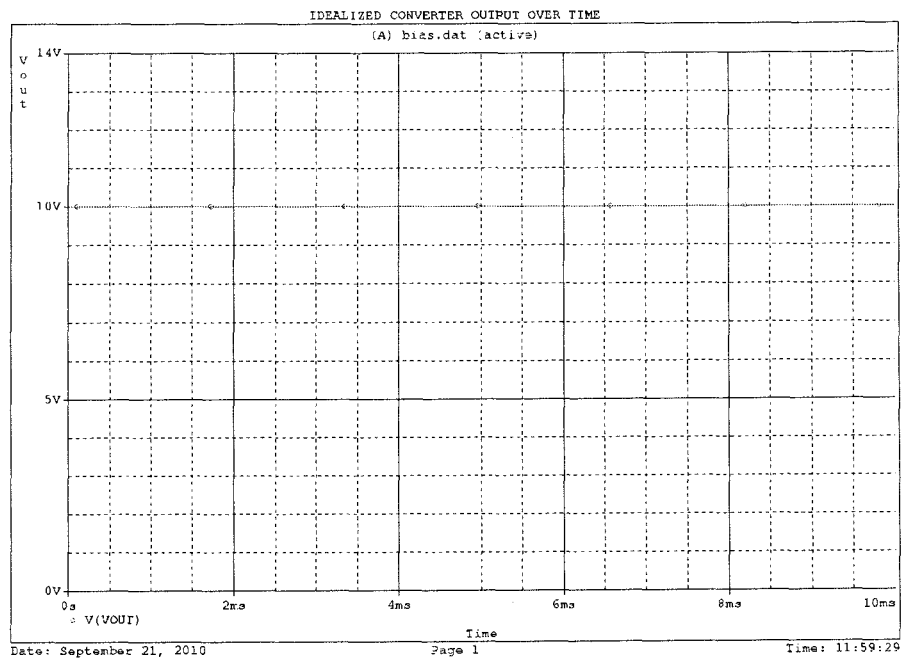
FIG. 1 is graph of voltage output over time of an idealized power converter over time.
Figure 2:
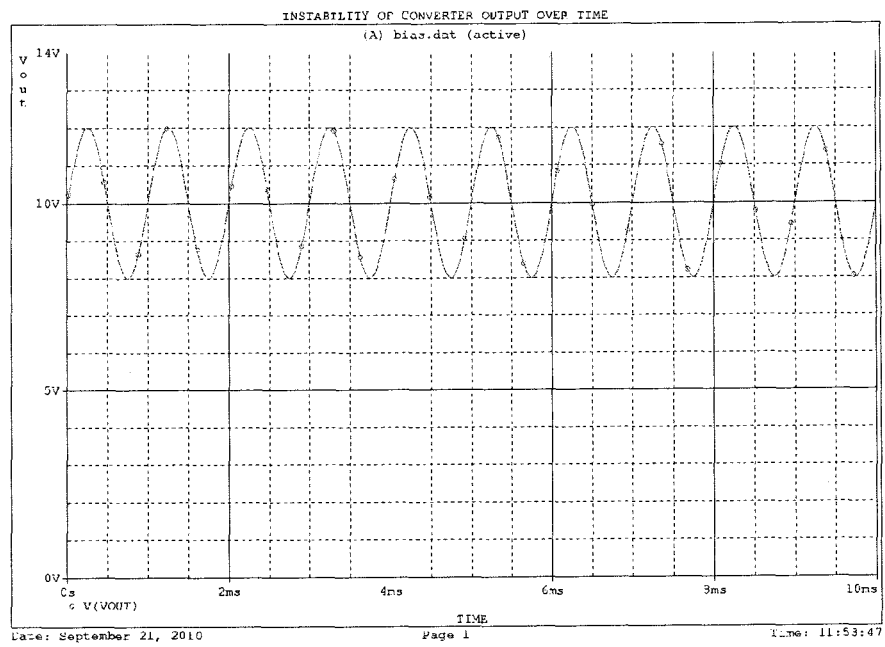
FIG. 2 is graph of voltage output over time of an unstable power converter.

The purpose of circuit 25 is to convert a constant input voltage Vin to a constant output voltage Vout in a manner similar to that illustrated in FIG. 1. However, the interaction of the Input Capacitor C1, Isolation Transformer T1 and Output Capacitor C2 can cause an instability in the output of circuit 25, as illustrated in FIG. 2. Such unstable voltage output may have a discernible repetitive pattern, as illustrated, with a period that is the product of the value of Capacitor C1 and Isolation Transformer T1, and, Isolation Transformer T1 and Output Capacitor C2, respectively, as illustrated by the formulas below:

$$\text{period} = (C1 \times LT1\text{pri})^{1/2}$$

$$\text{period} = (C2 \times LT1\text{sec})^{1/2}$$

where $LT1pri$ = T1 primary Inductance and
where $LT1sec$ = T1 secondary inductance The period is substantially identical for both Transformer/Capacitor pairs by design of circuit 25 wherein:

$$C2 = C1/N^2$$

$$LT1\text{sec} = LT1\text{pri} \times N^2$$

$N$ = Transformer $T1$ turns ratio

The instability created by the interaction of C1 with $LT1pri$ is stabilized by adding the serial sequence of Primary Stabilizing Capacitor Cd1, Primary Stabilizing Resistor Rd1 and Primary Stabilizing Inductor Ld1 in parallel with Input Capacitor C1 with values chosen as follows:

$$Cd1 = C1$$

$$Rd1 = R\text{load}/(D \times N^2)$$

$$Ld1 = LT\text{pri}$$

$D$ = duty ratio of $S1$ and $S2$

Primary Stabilizing Capacitor Cd1 and Ld1 act as a filter of period:

$$\text{Period} = (LT1\text{pri} \times C1)^{1/2}$$

This is the same period value as that of the instability and has the effect of exposing Primary Stabilizing Resistor Rd1 only to the frequency of the instability. This frequency is much lower than that of switches S1 and S2 so that Primary Stabilizing Resistor Rd1 has no effect on the normal desired operation of the circuit 25. The value of Primary Stabilizing Resistor Rd1 may be chosen to match the effective value of that of Load Resistor R1 for most efficient elimination of the instability.

Similarly, the instability created by the interaction of C2 with $LT1sec$ is stabilized by adding the serial sequence of Secondary Stabilizing Inductor Ld2, Secondary Stabilizing Resistor Rd2 and Secondary Stabilizing Capacitor Cd2 in parallel with Output Capacitor C2 with values chosen as follows:

$$Ld2 = LT1\text{-sec}$$

$$Rd2 = R\text{load}/D$$

$$Cd2 = C2$$

Secondary Stabilizing Inductor Ld2 and Secondary Stabilizing Capacitor Cd2 act as a filter of period:

$$\text{Period} = (LT1\text{pri} \times C1)^{1/2}$$

With similar properties to the Input Capacitor C1 with T1. In general:

$$\text{Period} = (Cd1 \times LT1\text{pri})^{1/2}$$

$$\text{Period} = (C1 \times LT1\text{pri})^{1/2}$$

$$\text{Period} = (Cd2 \times LT1\text{sec})^{1/2}$$

$$\text{Period} = (C2 \times LT1\text{sec})^{1/12}$$

$$Ld2 = Ld1 \times N^2$$

$$Rd2 = Rd1 \times N^2$$

$$Cd2 = Cd1/N^2$$

$$C2 = C1/N^2$$

Figure 4:
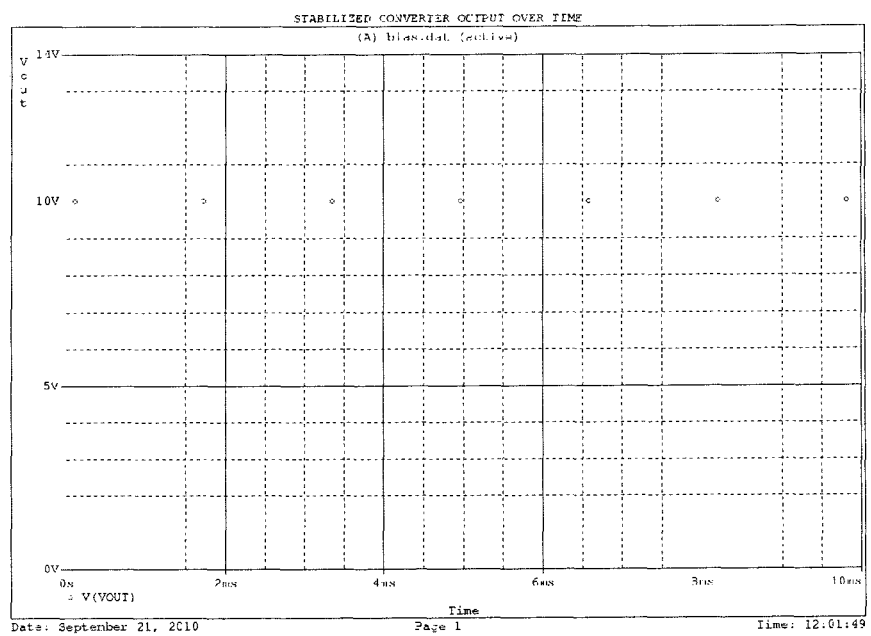
FIG. 4 is graph of voltage output over time of the power converter of FIG. 3.

The effect of the first branch RLC circuit of Primary Stabilizing Capacitor Cd1, Primary Stabilizing Resistor Rd1, and Primary Stabilizing Inductor Ld1 and the second branch RLC circuit of Secondary Stabilizing Inductor Ld2, Secondary Stabilizing Resistor Rd2 and Secondary Stabilizing Capacitor Cd2 as arranged in FIG. 3 is to yield a stable output voltage Vout as shown in FIG. 4.

The order of Primary Stabilizing Capacitor Cd1, Primary Stabilizing Resistor Rd1, and Primary Stabilizing Inductor Ld1 may be interchanged among themselves, as can the order of Secondary Stabilizing Inductor Ld2, Secondary Stabilizing Resistor Rd2 and Secondary Stabilizing Capacitor Cd2 among themselves without affecting the stabilizing influence of the three components collectively, however, the optimal arrangement is shown in FIG. 3 with like elements near each other and the resistor in the middle. Such arrangement prevents the RLC components from becoming degraded by parasitic effects, such as operating outside of their specified frequency range.

In an alternative embodiment, the resistor in each of the pair of RLC branch circuits inserted in parallel across the respective input and output capacitors may be replaced with a computer driven switch control element having a variation of the duty cycle D and D-1 of the switches S1 and S2, respectively. For example, Primary Stabilizing Resistor Rd1 may be replaced with a logic driven Primary Stabilization Input Switch S3 having a variation of duty cycle D1 of Input Switch S1 while Secondary Stabilizing Resistor Rd2 may be replaced with a logic driven Secondary Stabilization Input Switch S4 having a variation of duty cycle D-1 of Output Switch S2. In embodiments, the duty cycles of Input Switch S1 and Output Switch S2 may be substantially similar or dissimilar. Also, the frequencies at which Input Switch S1 and Output Switch S2 operate may be substantially similar or dissimilar. The respective duty cycle and frequency of operation of each such switch S1 and Output Switch S2 being chosen to optimally match the periodicity of the instability introduced by each side of the power conversion circuit 25 resulting from the respective interaction of the input capacitor with the isolation transformer and the interaction of output capacitor with the isolation transformer.

According to one aspect of the disclosure, a kit containing Primary and Secondary Stabilizing Capacitors Cd1 and Cd21, Primary and Secondary Stabilizing Inductors Ld1 and Ld2, and Primary and Secondary Stabilizing Resistors Rd1 and Rd2 may be utilized to modify legacy power converter topologies having an Input Capacitor C1, Output Capacitor C2 and Isolation Transformer T1 arranged similar to circuit 25. The components of the kit may be utilized to form the first and second RLC branches which can then be soldered across Input Capacitor C1 and Output Capacitor C2 to achieve the same stabilizing effects.

The circuit 25 disclosed herein eliminates the instability of prior art power converters enabling a highly stable low electro magnetic interference power conversion topology with low complexity and cost.

It will be obvious to those recently skilled in the art that modifications to the apparatus and process disclosed here in may occur, including substitution of various component values or nodes of connection, without parting from the true spirit and scope of the disclosure.

What is claimed is:

1. A kit apparatus for stabilizing a periodic instability in the output of a power converter, the power converter having an isolation transformer operatively coupled to a power converter input by an input capacitor and an input inductor and further operatively coupled to a power converter output by an output capacitor and an output inductor, the kit comprising:
   a primary stabilizing subsystem comprising a primary stabilizing capacitor, a primary stabilizing inductor, and primary resistor; and
   a secondary stabilizing subsystem comprising a secondary stabilizing capacitor, a secondary stabilizing inductor, and a secondary stabilizing resistor;
   wherein the primary stabilizing subsystem is configured for connection in parallel with the input capacitor between the isolation transformer and the input inductor;
   wherein the secondary stabilizing subsystem is configured for connection in parallel with the output capacitor between the isolation transformer and the output inductor.

2. The kit apparatus of claim 1 wherein one of the primary and secondary stabilizing subsystems are configured to form an RLC branch having a capacitor, resistor and inductor serially interconnected in any order.

3. The kit apparatus of claim 1 wherein both of the primary and secondary stabilizing subsystems are configured to form an RLC branches having a capacitor, resistor and inductor serially interconnected in any order.

4. The kit apparatus of claim 2 wherein the primary stabilizing subsystem comprises an RLC branch having the primary resistor serially connected intermediate the primary capacitor and primary inductor.

5. The kit apparatus of claim 4 wherein the primary stabilizing subsystem is configured for connection in parallel with the input capacitor so that the primary inductor of the primary stabilizing subsystem is coupled directly to the isolation transformer.

6. The kit apparatus of claim 2 wherein the secondary stabilizing subsystem comprises an RLC branch having the secondary resistor serially connected intermediate the secondary capacitor and secondary inductor.

7. The kit apparatus of claim 6 wherein the secondary stabilizing subsystem is configured for connection in parallel with the output capacitor so that the secondary inductor of the secondary stabilizing subsystem is coupled directly to the isolation transformer.

8. The kit apparatus of claim 1 wherein a capacitance value of the primary stabilizing capacitor is essentially equivalent to a capacitance value of the input capacitor.

9. The kit apparatus of claim 8 wherein the primary stabilizing capacitor and primary stabilizing inductor have values selected to create a filter function having a period substantially equal to the frequency of the instability of the power converter circuit.

10. The kit apparatus of claim 1 wherein a capacitance value of the secondary stabilizing capacitor is essentially equivalent to a capacitance value of the output capacitor.

11. The kit apparatus of claim 9 wherein the secondary stabilizing capacitor and secondary stabilizing inductor have values selected to create a filter function having a period substantially equal to the frequency of the instability of the power converter circuit.

12. A method for stabilizing a periodic instability in the output of a power converter, the power converter having an isolation transformer operatively coupled to a power converter input by an input capacitor and an input inductor and further operatively coupled to a power converter output by an output capacitor and an output inductor, the method comprising:
   A) providing a primary stabilizing subsystem further comprising:
      i) a primary stabilizing capacitor,
      ii) a primary stabilizing inductor, and
      iii) a primary resistor; and
   B) providing a secondary stabilizing subsystem further comprising:
      i) a secondary stabilizing capacitor,
      ii) a secondary stabilizing inductor, and
      iii) a secondary resistor; and
   C) connecting the primary stabilizing subsystem in parallel with the input capacitor between the isolation transformer and the input inductor; and
   D) connecting the secondary stabilizing subsystem in parallel with the output capacitor between the isolation transformer and the output inductor.

13. The method of claim 12 wherein C) comprises:
   C1) serially interconnecting the primary stabilizing capacitor, primary stabilizing resistor and primary stabilizing inductor in any order.

14. The method of claim 13 wherein the primary stabilizing resistor is serially connected intermediate the primary stabilizing capacitor and primary stabilizing inductor and wherein C) further comprises:

C2) connecting the primary stabilizing subsystem in parallel with the input capacitor so that the primary stabilizing inductor of the primary stabilizing subsystem is coupled directly to the isolation transformer.

15. The kit apparatus of claim 12 wherein D) comprises:

D1) serially interconnecting the secondary stabilizing capacitor, secondary stabilizing resistor and secondary stabilizing inductor in any order.

16. The method of claim 15 wherein the secondary stabilizing resistor is serially connected intermediate the secondary stabilizing capacitor and secondary inductor and wherein C) further comprises:

D2) connecting the secondary stabilizing subsystem in parallel with the output capacitor so that the secondary stabilizing inductor of the secondary stabilizing subsystem is coupled directly to the isolation transformer.

17. A power converter circuit system comprising:
   an isolation transformer operatively coupled to a power converter input and a power converter output;
   a serially connected input capacitor and input inductor pair coupled intermediate a node of the power converter input and a node of the isolation transformer;
   a serially connected output capacitor and output inductor pair coupled intermediate a node of the power converter output and a node of the isolation transformer;
   a primary stabilizing RLC branch coupled in parallel with the input capacitor, the primary stabilizing RLC branch comprising a primary stabilizing resistor serially coupled intermediate a primary stabilizing capacitor and a primary stabilizing inductor; and
   a secondary stabilizing RLC branch coupled in parallel with the output capacitor, the secondary stabilizing RLC branch comprising a secondary stabilizing resistor serially coupled intermediate a secondary stabilizing capacitor and a secondary stabilizing inductor.

18. The system of claim 17 wherein the primary stabilizing inductor is coupled directly to the isolation transformer.

19. The system of claim 17 wherein the secondary stabilizing inductor is coupled directly to the isolation transformer.

20. The system apparatus of claim 17 wherein capacitance value of the primary stabilizing capacitor and secondary stabilizing capacitors are substantially equivalent to capacitance value of the input capacitor and output capacitor, respectively.

* * * * *